(12) United States Patent
Shkolnik

(10) Patent No.: US 12,202,210 B1
(45) Date of Patent: Jan. 21, 2025

(54) ADDITIVE MANUFACTURING SYSTEM

(71) Applicant: Turbo 3d LLC, Gardena, CA (US)

(72) Inventor: Alexandr Shkolnik, Gardena, CA (US)

(73) Assignee: Turbo 3d LLC, Gardena, CA (US)

( * ) Notice: Subject to any disclaimer, the term of this patent is extended or adjusted under 35 U.S.C. 154(b) by 0 days.

(21) Appl. No.: 18/762,593

(22) Filed: Jul. 2, 2024

(51) Int. Cl.
| | |
|---|---|
| *B29C 64/129* | (2017.01) |
| *B29C 64/241* | (2017.01) |
| *B29C 64/264* | (2017.01) |
| *B29C 64/393* | (2017.01) |
| *B33Y 30/00* | (2015.01) |
| *B33Y 50/02* | (2015.01) |

(52) U.S. Cl.
CPC .......... *B29C 64/393* (2017.08); *B29C 64/129* (2017.08); *B29C 64/241* (2017.08); *B29C 64/264* (2017.08); *B33Y 30/00* (2014.12); *B33Y 50/02* (2014.12)

(58) Field of Classification Search
CPC ... B29C 64/218; B29C 64/241; B29C 64/264; B29C 64/268; B29C 64/277; B29C 64/129
See application file for complete search history.

(56) References Cited

U.S. PATENT DOCUMENTS

| | | | |
|---|---|---|---|
| 7,833,389 B1* | 11/2010 | Slafer | G03F 7/24 |
| | | | 204/272 |
| 11,186,036 B2* | 11/2021 | Kajita | B29C 64/268 |
| 11,273,496 B2* | 3/2022 | Pan | B23K 26/34 |
| 11,273,601 B2* | 3/2022 | Pan | B22F 12/57 |
| 11,485,080 B2* | 11/2022 | Zavoyskikh | B29C 64/343 |
| 2019/0314894 A1* | 10/2019 | Pan | B29C 64/241 |
| 2020/0139626 A1* | 5/2020 | Pan | B29C 64/336 |
| 2020/0156290 A1* | 5/2020 | Corsmeier | B23K 26/082 |
| 2020/0180224 A1* | 6/2020 | Budge | B33Y 10/00 |
| 2020/0307084 A1* | 10/2020 | Kajita | B29C 64/268 |
| 2022/0152927 A1* | 5/2022 | Zavoyskikh | B29C 64/245 |
| 2023/0018656 A1* | 1/2023 | Zavoyskikh | B29C 64/343 |

* cited by examiner

*Primary Examiner* — Seyed Masoud Malekzadeh
(74) *Attorney, Agent, or Firm* — Buchalter

(57) ABSTRACT

An additive manufacturing system is described that provides centrifuge-based additive object manufacturing includes a drum containing a working material that solidifies after being irradiated by a light source, the working material spreads evenly over an item being manufactured when the drum is in motion, a light source module emitting a light capable of solidifying the working material, and a material delivery system for adding a controlled amount of the working material into the drum. The light source module moves vertically within the rotating drum and selectively emits its light solidifying the part of the layer of working material above a part currently being manufactured.

16 Claims, 14 Drawing Sheets

ADDITIVE MANUFACTURING SYSTEM

BACKGROUND

Field of the Invention

The present invention relates to a system and method for providing 3D object manufacturing, and more specifically, to a system and method for providing centrifuge-based additive object manufacturing.

Description of Related Art

Current techniques for additive manufacturing of three-dimensional objects (e.g., stereolithography, 3-D printing, etc.) can produce excellent quality products with high fidelity, but such techniques have significant limitations. Typically, such techniques work in one of three ways: (a) continually polymerizing layers at or near the surface of liquid resin contained in a stationary vat, (b) continually polymerizing layers of resin at or near the bottom of a stationary vat of resin through a transparent membrane, or (c) continually polymerizing layers of resin that have been jetted downward by one or more single-nozzle or multi-nozzle print heads.

Technique (a) requires maintaining tight control over the material level and leading to part inaccuracies due to a meniscus forming, voids during material application, etc. Technique (b) often causes process failures and thus destruction of the objects forming due to separation forces. Even utilizing the so-called "dead zone" is prone to failures due to vacuum forces created during the process of delivering material for the next layer. Technique (c) requires a uniform distribution of a newly formed layer over the previous one, which is not an easy task.

Therefore, a need exists for a system and method for providing improved additive object manufacturing. The present invention attempts to address the limitations and deficiencies of prior solutions utilizing the principles and example embodiments as disclosed herein.

SUMMARY

In accordance with the present invention, the above and other problems are solved by providing a system and method for providing centrifuge-based additive object manufacturing according to the principles and example embodiments disclosed herein.

A system is described that includes a drum comprising an interior-facing curved surface; a light source module emitting a light capable of solidifying a working material arranged along the interior-facing curved surface of the rotating drum; a motor affixed to and configured to apply a rotational moment directly to the drum; and a material delivery system comprising a material delivery channel that extends along a longitudinal axis of the motor and to a base of the drum.

In some embodiments, at least a portion of the material delivery system extending through the motor rotates at the same speed as the drum during operation of the system.

In some embodiments, the system includes a sensor configured to measure a rotational speed of the drum; and a processor configured to direct changes to operation of the light source module based on a determined rotational position and/or speed of the drum.

In some embodiments, the sensor is a laser indexer and the processor is configured to increase an accuracy of the laser indexer by estimating a rotational speed of the drum refine the position information provided by the laser indexer based on the estimated rotational speed.

In some embodiments, the system of claim also includes a rotary union disposed at a distal end of the material delivery channel, the rotary union having an upper assembly configured to rotate with the material delivery channel and a lower assembly mated with a conduit that delivers the working material into the rotary union and subsequently into the material delivery channel.

In some embodiments, the rotary union further comprises a ball bearing configured to reduce friction during rotation of the upper assembly relative to the lower assembly. In some embodiments, the drum has a sloped bottom surface and the material delivery system is configured to supply the working material to the sloped bottom surface of the drum. In some embodiments, the sloped bottom surface has a slope of between ten and twenty degrees.

In some embodiments, the light source module is configured to translate vertically within the drum to irradiate different portions of the working material positioned on the interior-facing curved surface.

In some embodiments, the light source module comprises multiple laser diodes arranged in a vertical configuration. In some embodiments, the system includes a processor configured to adjust operation of the light source module based on known misalignments of the plurality of laser diodes of the light source module.

In some embodiments, the working material is a photopolymer material. In some embodiments, the system includes a processor configured to adjust operation of a power output of the light source module based on geometry of parts being produced within the drum.

In some embodiments, the power output variation includes adjusting the output power of the light source between three or more different power output states.

In some embodiments, the material delivery system is configured to periodically add a specific amount of working material to the drum sufficient to create a 5-250 micron layer of working material on the interior-facing curved surface of the drum.

In some embodiments, the drum comprises one or more fins that inhibit a radial flow of working material within the drum during operation of the system.

BRIEF DESCRIPTION OF THE DRAWINGS

The features, objects, and advantages of the present invention will become more apparent from the detailed description set forth below when taken in conjunction with the drawings, wherein.

DETAILED DESCRIPTION

The detailed description of exemplary embodiments herein makes reference to the accompanying drawings and pictures, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1A:
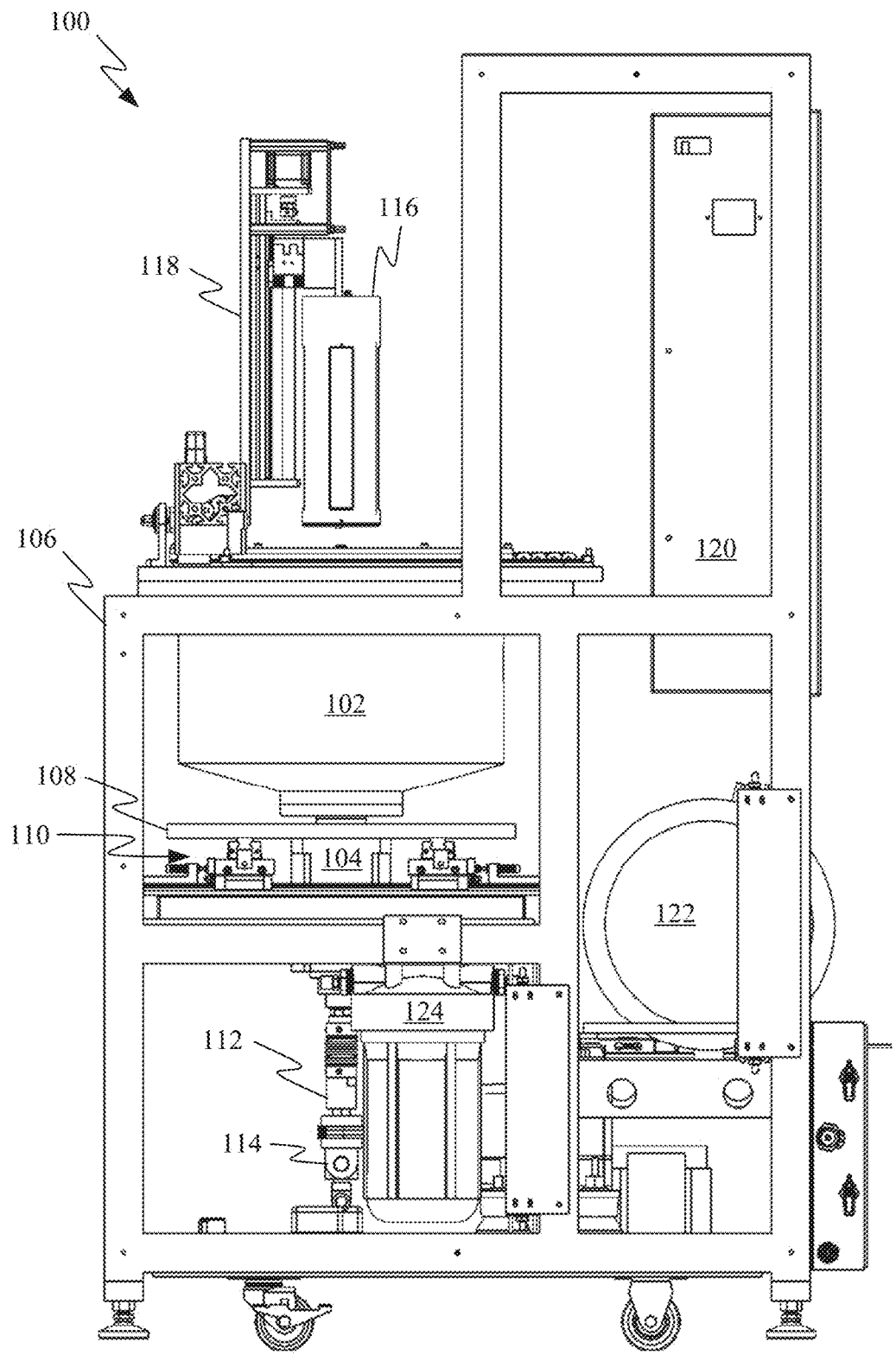
FIGS. 1A-1C show side, front and perspective views of an exemplary centrifugal additive manufacturing system.
Figure 1B:
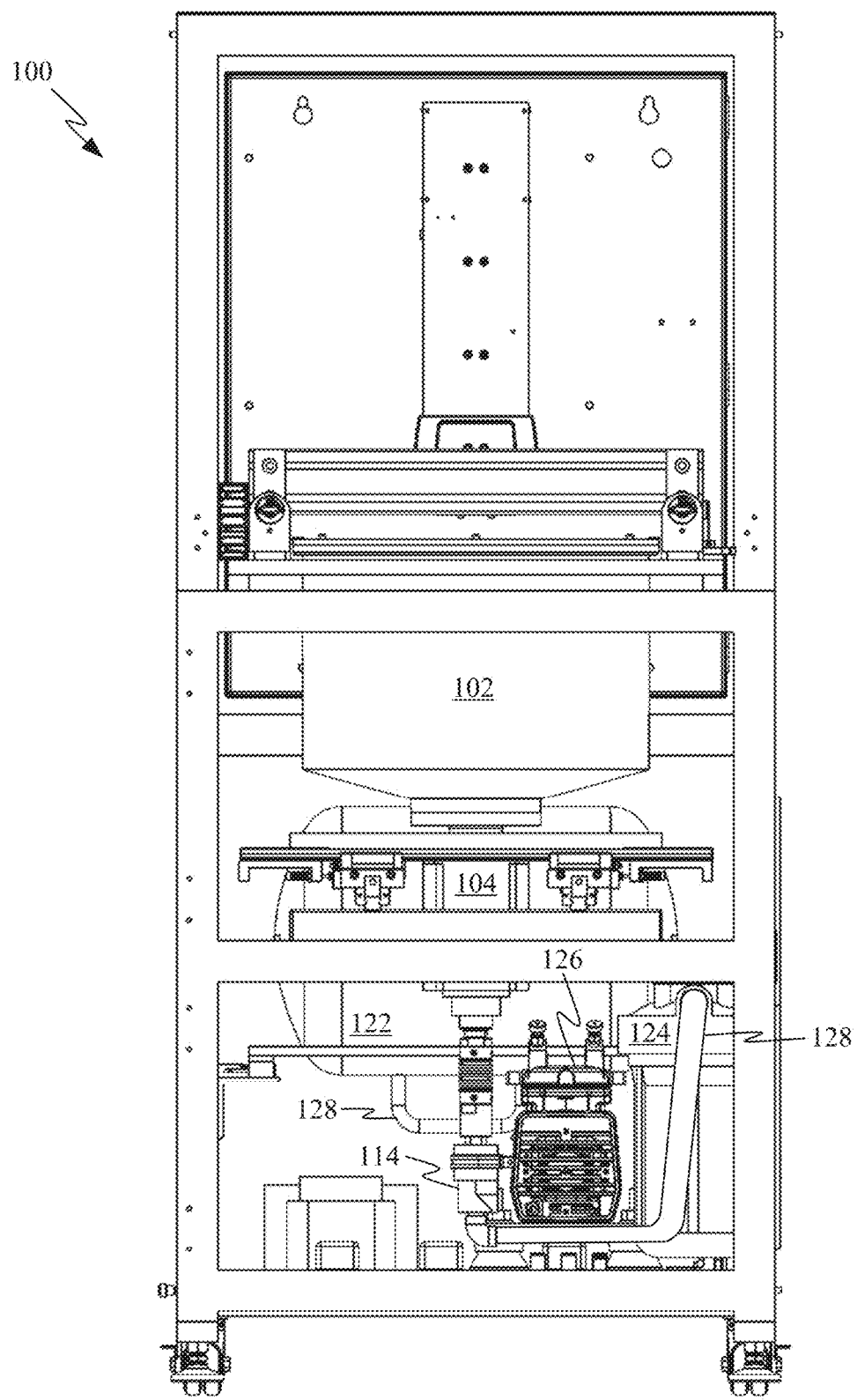
Figure 1C:
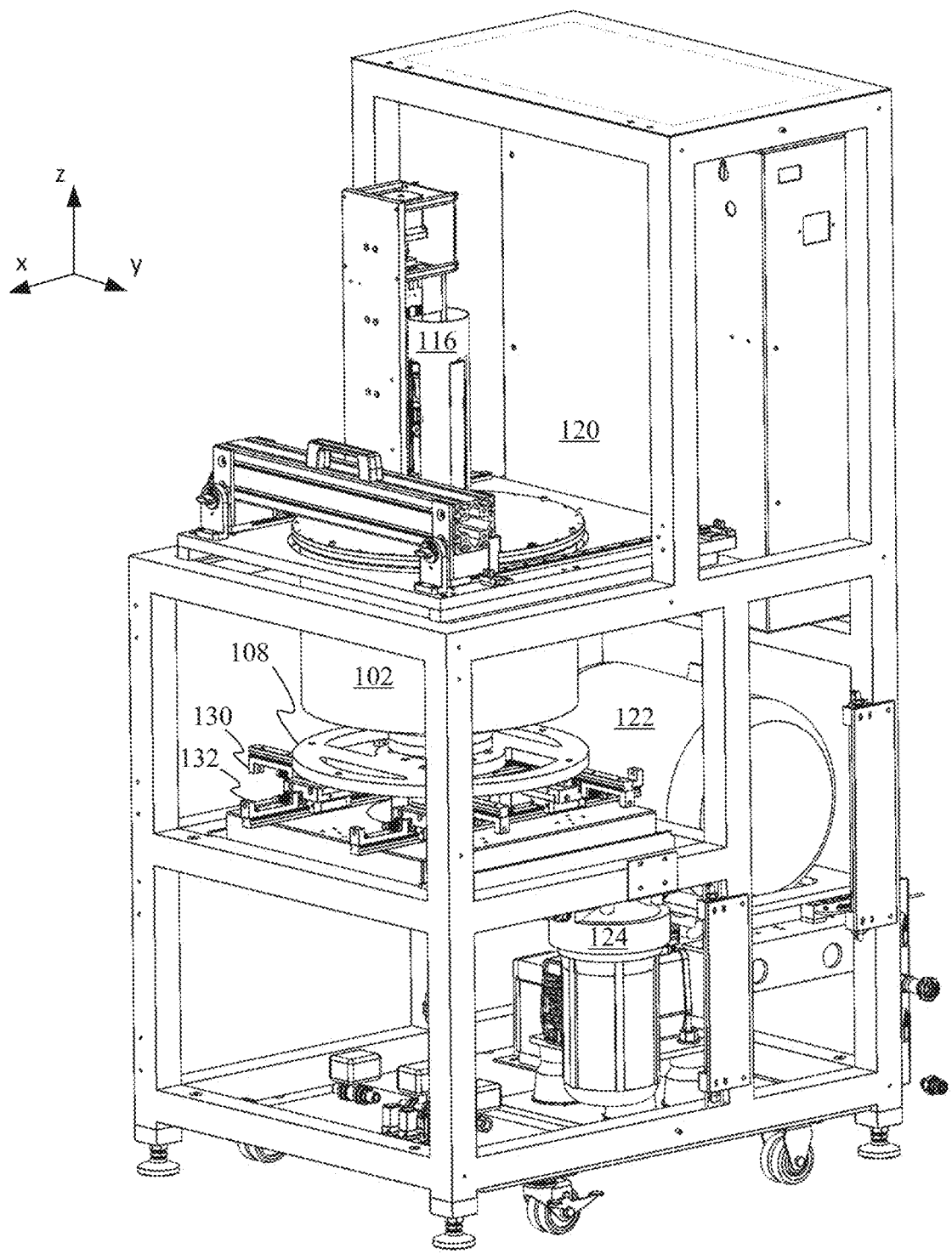

In general, the present disclosure relates to a system and method for providing 3D object manufacturing. The disclosed embodiments each involve the application of a new layer of material, such as a photopolymer, a powder or any other type of material that is capable of changing phase or solidifying under irradiation. To better understand the present invention, FIGS. 1A-1C show side, front and perspective views of a centrifugal additive manufacturing system 100 attached to a mobile cart that allows for system 100 to be transported to various locations. It should be appreciated that centrifugal manufacturing system 100 can instead be attached to a fixed location. A fixed location can be more beneficial in situations where increased stability is desired and/or the system is scaled up in size to a point where easy relocation is no longer feasible.

FIG. 1A shows a first side view of system 100. System 100 includes a drum 102 within which system 100 creates new parts. Motor 104 is located beneath drum 102 and configured to rotate drum 102. Motor 104 can be a direct drive motor attached directly to a base of drum 102. In some embodiments, drum 102 and motor 104 can be attached to cart 106 by a motor mounting plate 108 and a suspension system 110 that allows for a limited amount of lateral movement of drum 102 and motor 104 during operation of system 100. Allowance of a small amount of lateral movement can be helpful in preventing unwanted vibrational excursions when rotating drum 102 at high rotational velocities. Suspension system 110 includes a series of springs and rails that biases a position of drum 102 and motor 104 toward a central location but as mentioned above also allows for up to 5 mm of lateral movement to help dissipate undesired vibrational excursions of drum 102 resulting from addition, subtraction or movement of materials within drum 102.

A material deliver channel 112 extends through and along a longitudinal axis of motor 104 and into a base of drum 102. A series of bushings further extend a length of material delivery channel 112 below motor 104 and to a rotary union 114, which includes one or more ports for supplying material into material delivery channel 112. Rotary union 114 includes a stationary lower assembly for attachment to one or more hoses for supplying material into material delivery channel 112 and an upper assembly coupled to the lower assembly by a bearing that allows for rotation of the upper assembly relative to the lower assembly. This configuration allows material delivery channel 112 to rotate with drum 102 so that material being supplied to drum 102 through material delivery channel 112 shares the same inertial reference frame as drum 102 prior to arriving and being deposited within drum 102. This helps to improve an evenness of the distribution of material being added into the base of drum 102.

FIG. 1A also shows a location of a light source module 116 elevated above drum 102. As depicted, light source module 116 is affixed to cart 106 by a vertical movement assembly 118 that includes a motor responsible for moving light source module 116 vertically into and out of a light source module opening in drum 102 during operation of system 100. An electrical panel 120 is attached to a rear side of cart 106 and configured to power the various components of system 100. FIG. 1A also shows a location of tank 122, which is responsible for holding material that is introduced into drum 102 and in some embodiments also responsible for regulating a temperature of the material so that when used its properties are as expected. In some embodiments, the material held by tank 122 can be a photopolymer material that solidifies when irradiated by a light source. Also depicted is a filter 124 that can optionally be utilized to remove any impurities in the material held within tank 122 prior to the material being introduced into drum 102.

FIG. 1B shows a front view of system 100 that illustrates a location of pumping mechanism 126 relative to other components of system 100. In particular, pumping mechanism 126 is linked by one or more conduits 128 to other components and designed to utilize those conduits to move material from tank 122, through filter 124 and into rotary union 114 and ultimately up material delivery channel 112, through motor 104 and into drum 102. Pumping mechanism 126 can be designed to periodically deliver precise amounts of material into drum 102 to avoid instances of a waste of material or an overly thick or thin layer of material that negatively affects accuracy or stability of a resulting part. Exemplary layer thicknesses generally vary from between 10 microns to 50 microns but can also vary more widely between a range of 5 microns and 250 microns depending on the intended purpose of the work to be done by the system. In some embodiments, pumping mechanism 126 can take the form of a motorized syringe style delivery mechanism allowing a precise cylindrical displacement of working material to be added to provide material into drum 102 in a precise amount and at a precise rate. In other embodiments, other types of pumping mechanisms can be used such as metering pumps, plunger pumps or diaphragm pumps. In some embodiments, system 100 can include multiple pumping mechanisms to inject different types of fluids into and out of drum 102. For example, cleaning and/or curing fluids can also be routed through material delivery channel 112.

FIG. 1C shows a perspective view of system 100 and a view of suspension system 110, which includes orthogonal bearings 130 and 132 that accommodate small movements in the X and Y directions. Motor mounting plate 108 is also shown fastened in multiple locations to suspension system 110 in a manner such that motor mounting plate is prevented from rotating during operation of system 100, thereby allowing motor 104 to drive operation apply rotation to drum 102.

Figure 2:
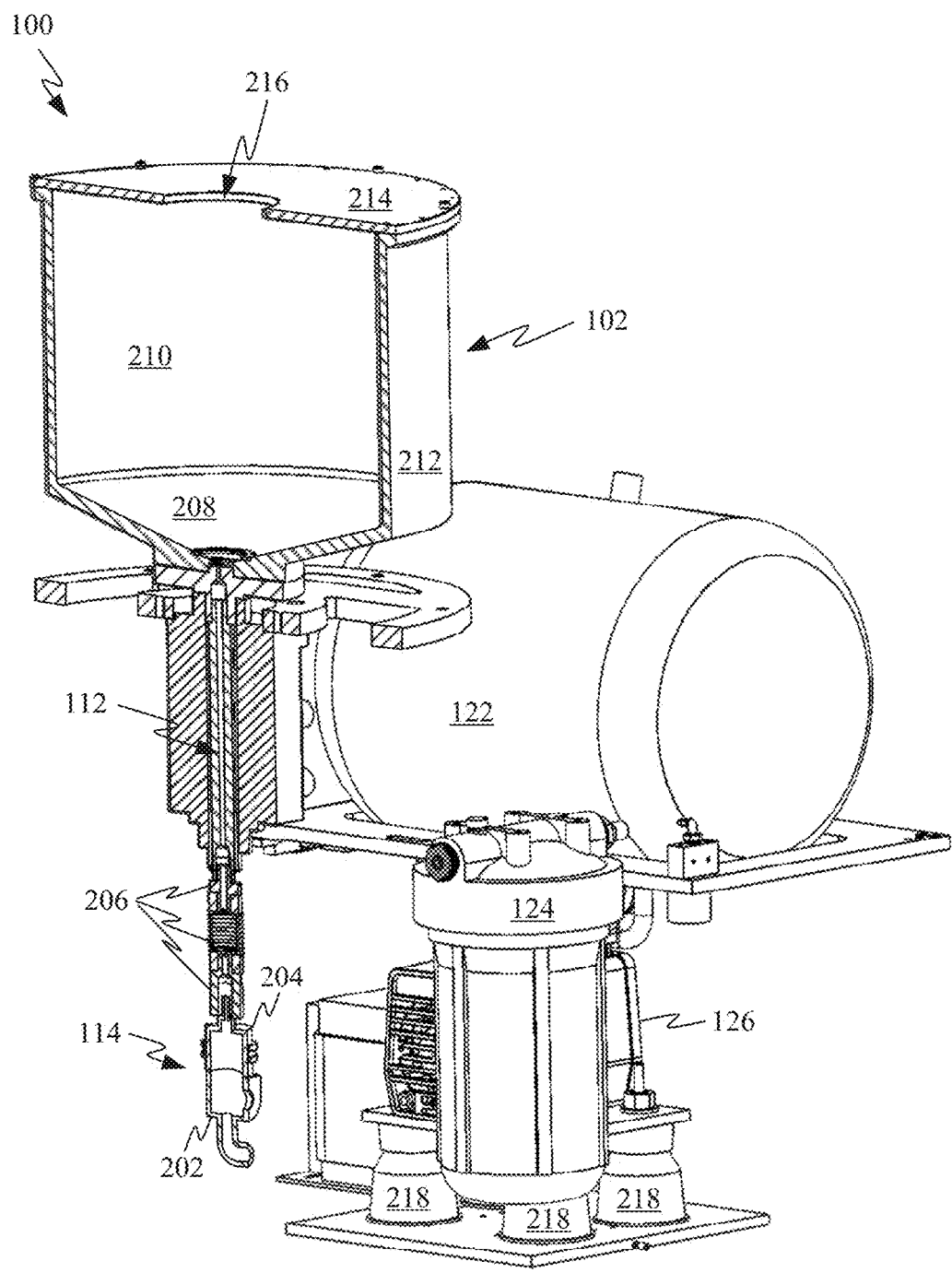
FIG. 2 shows a perspective view of a select group of components of an additive manufacturing system that illustrates a cross-section of portions of a drum, a motor, a rotary union and a material delivery channel.

FIG. 2 shows a perspective view of a select group of components of system 100 that illustrates a cross-section of portions of drum 102, motor 104, rotary union 114 and material delivery channel 112. In particular, rotary union 114 is shown with lower assembly 202 and upper assembly 204 that is configured to rotate with respect to lower assembly 202. Lower assembly 202 is shown with two ports for attaching conduits configured to deliver material stored in tank 122 or cleaning or curing solution stored in other containers of system 100 into material delivery channel 112. Once the liquid passes through rotary union 114 it enters the portion of material delivery channel formed by bushing elements 206 that connect rotary union 114 to motor 112.

FIG. 2 also shows how drum 102 includes a sloped interior-facing bottom surface leading up to a curved sidewall 210. An angle of the interior facing bottom surface could be sloped at an angle of between 10 and 25 degrees. In one particular embodiment, a sloped angle of 18 degrees can be used. The sloped bottom surface reduces the speed material hits sidewall 210 and thereby prevents the material from splashing and thereby spreading more turbulently when hitting sidewall 210 at higher speeds. In some embodiments, a conformal sleeve can be arranged along curved sidewall 210 allowing for parts formed against sidewall 210 to be easily removed from drum 102 following part formation. Furthermore, the conformal sleeve can be formed of flexible material such as sheet metal that when flattened pulls away from the curved rearward geometry of formed parts to easily separate the parts without doing unintentional damage.

FIG. 2 also shows how drum 102 can be formed of a main body 212 and a lid 214. Lid 214 includes an opening 216 sized to receive light source module 116. Opening 216 can be sized slightly larger than a diameter of light source module 116 such that drum 102 is able to shift laterally, as allowed by suspension 110, without resulting in any collisions between light source module 116 and drum 102. FIG. 2 also shows pump mechanism 126 mounted on multiple springs 218 that help prevent any vibrations generated by operation of pump mechanism 126 from disrupting consistent rotation of drum 102 during operation of system 100.

Figure 3A:
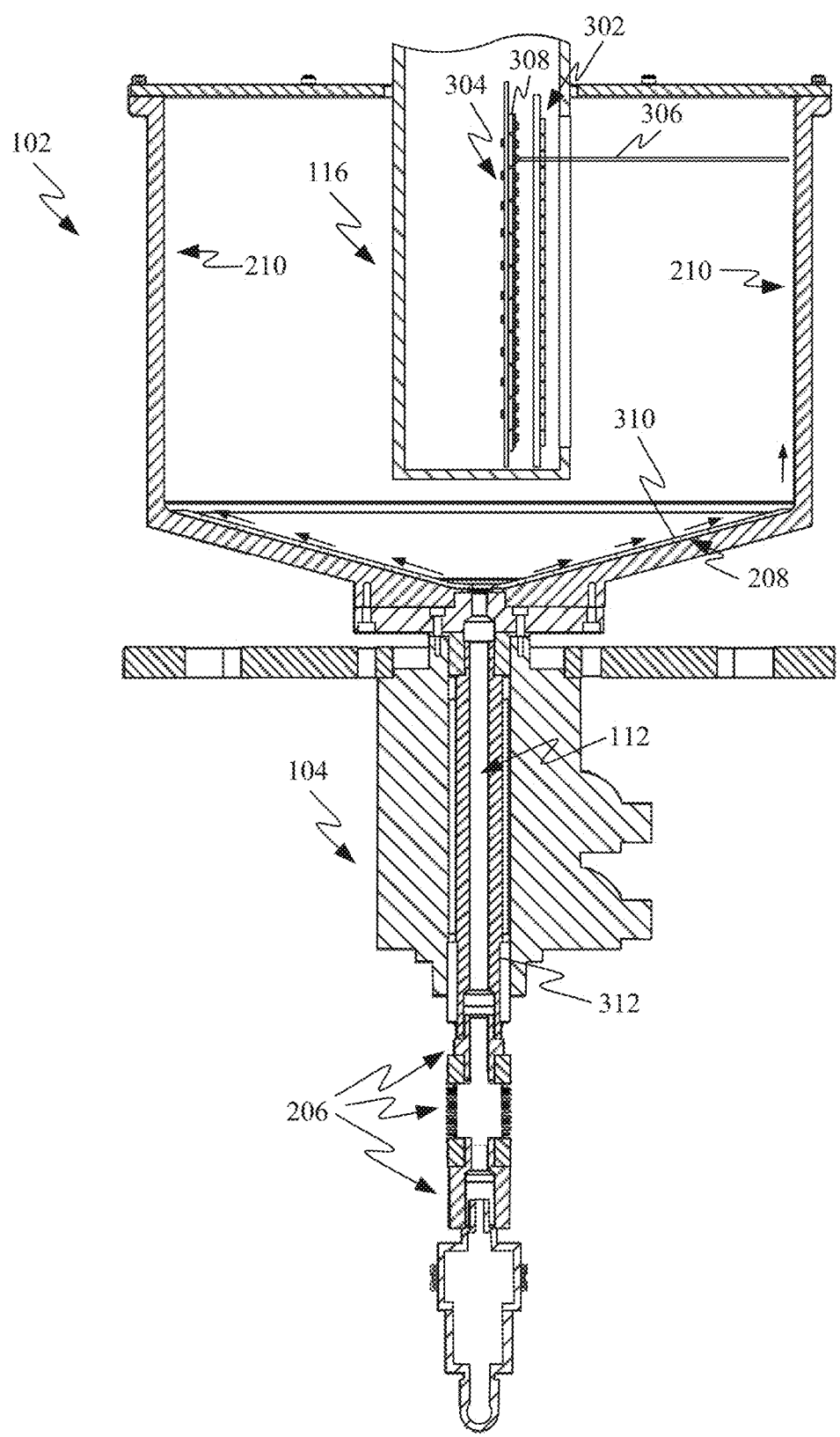
FIGS. 3A-3C show a cross-sectional side views of a drum, a motor and a light source module inserted within the drum during operation of the system.

FIG. 3A shows a cross-sectional side view of drum 102, motor 104 and light source module 116 inserted within drum 102. Light source module 116 is inserted within drum 102 during normal operation of system 100. Light source module includes a lens assembly 302 and a light source assembly 304. Lens assembly 302 is configured to move closer to or farther away from light source assembly 304 in order to focus light 306 generated by laser diodes 308 arranged along light source assembly 304 on curved sidewall 210. While only a single laser diode is shown emitting light 308 it should be appreciated that all 20 laser diodes depicted in FIG. 3 could be concurrently activated in the event a particularly large part is being built within drum 102. Since light source module 116 does not rotate with drum 102, laser light emitted by light source module 116 scans across curved surface at the speed of the rotation of drum 102. While a light source module 116 is shown that includes 20 laser diodes 306, it should be appreciate that a fewer or larger number of laser diodes and associated lenses is also possible. In some embodiments, light source module 116 can translate vertically in order to allow the light generated by the laser diodes to solidify portions of material arranged on sidewall 210 that is located vertically between laser diodes 308. In some embodiments, laser diodes and lenses can be packed together at an interval allowing coverage of an entirety of material arranged on sidewall 210 during operation of system 100. In the present embodiment, each laser diode can be responsible for covering a vertical length of about 10-15 mm.

In addition to carrying laser diodes, light source module can also include LEDs designed to apply a curing process to the finished parts within drum 102. In some specific embodiment, the LEDs can be incorporated into a first side of light source assembly 304 opposite from a second side of light source assembly 304 that carries laser diodes. By placing optical windows on opposing sides of light source module 116, light source module 116 can assist with both solidification of the working material and with curing of the solidified working material.

Timing of the actuation of light source module 116 is important to the proper formation of parts within drum 102. Furthermore at the speeds that drum 102 travels, conventional methods of determining with high precision a rotational position of drum 102 is quite challenging. The presently disclosed system 100 incorporates a sensor known as a laser encoder to determine a current rotational position of drum 102. However due to the rapid rotational speeds commonly reached by drum 102 (e.g. greater than 1500 rpm), utilizing a standard, off the shelf laser encoder would lack the accuracy needed to fire the various laser diodes that drive light source module at precisely the right times to get a desired level of part accuracy. This is a result of a standard laser encoder not being capable of including a large enough number of tic marks it relies upon to tell current rotational position. For this reason, a processor being utilized to fire the light generating components of light source module 116 at the proper times can interpolate a current rotational position of drum 102 by estimating a rotational position of drum 102 utilizing instantaneous drum rotational speeds. In this way, instead of reporting the final tic mark detected by the laser encoder a position of drum 102 between tic marks can be determined and used to help determine a more precise time at which light source module 116 is set to operate each of its light generating components or laser diodes in the present exemplary embodiment.

FIG. 3A also shows a flow of material 310 delivered through material delivery channel 112 up sloped bottom surface 208 of drum 102 as it approaches sidewall 210. In some embodiments, solidification operations are paused as the material for forming the next layer in drum 102 begins flowing up side wall 210. In some embodiments, it can take between 0.5 and 2 seconds for the material to travel from pump mechanism 126 to a base portion of sidewall 210 and then about 0.2 to 0.5 seconds to make its way up the sidewall of drum 102. Time taken will depend on the height of the walls of drum 102, the amount of material supplied and the speed at which the material is pumped into drum 102. Thickness of the layers of material arranged on curved side wall 210 can be driven by a speed of rotation of drum 102. Generally, by varying the rotational speed and resulting amount of centrifugal forces applied to the liquid material on sidewall 210, the designers have the benefit of specifying specific layer thicknesses when needed to achieve a specific part accuracy. This is achievable with the disclosed configurations since higher g-forces tend to compress the liquid material against sidewall 210 by a greater amount than lower g-forces.

Figure 3B:
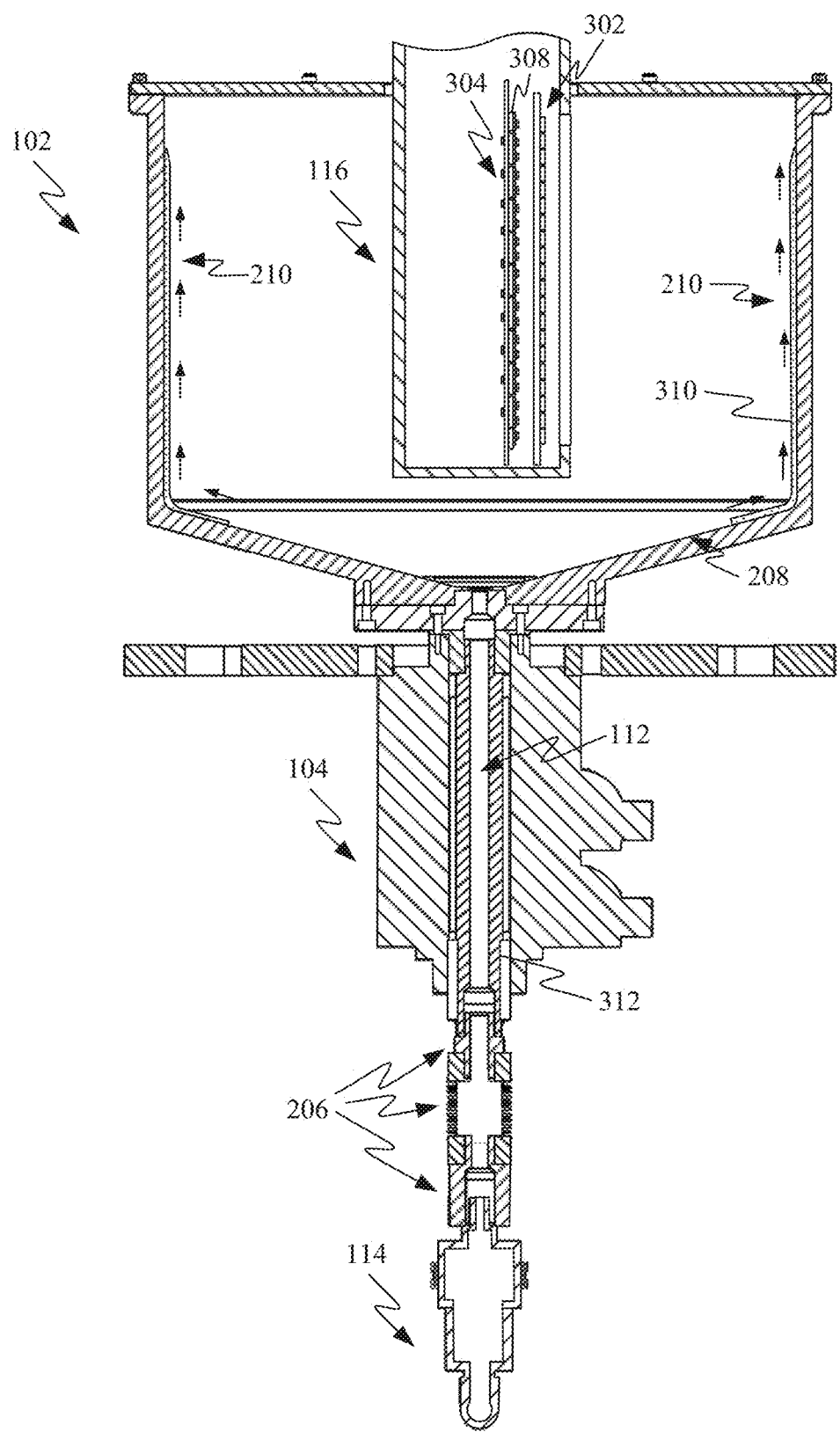

FIG. 3A also shows how a portion of material delivery channel 112 running through motor 104 is defined by tubing 312, which keeps any of the material from getting lodged within mechanical components of motor 104 as it moves from bushing elements 206 to drum 102. While tubing is used in this particular configuration it should be appreciated that a motor could also be used with a liquid resistance channel instead of the tubing shown in FIG. 3A. As depicted, tubing 312 connects one end of bushing elements 206 to a base portion of drum 102. FIG. 3B shows how material 310 moves up bottom wall 208. During this time and as depicted illumination from laser diodes 308 is ceased. This offers a large benefit over previously designed systems that generally require use of a material deposition arm or module taking up space within the working space, resulting in high complexities and limitations that can slow operation of the system.

Figure 3C:
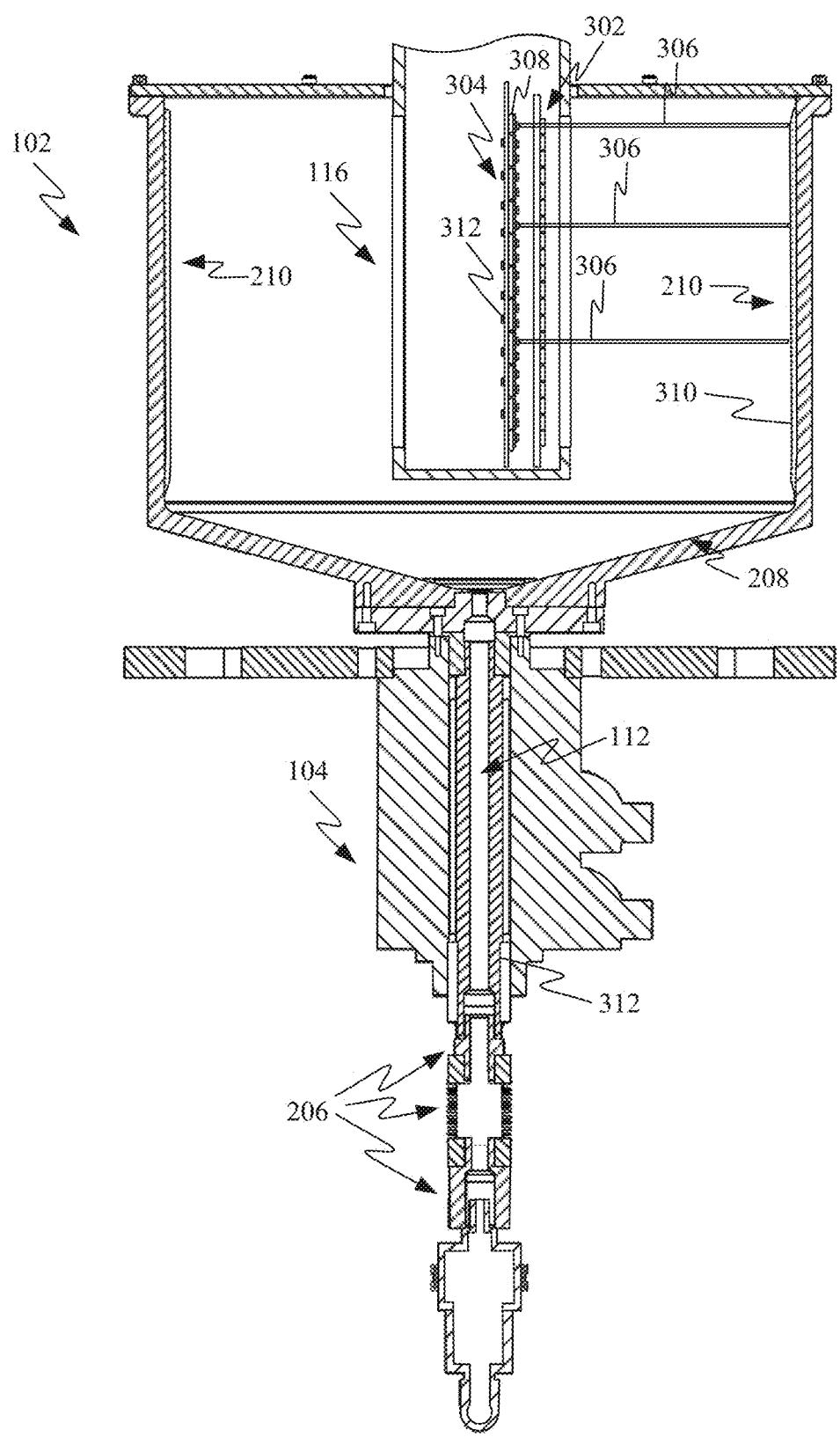

FIG. 3C shows a final resting position for material 310 prior to it stabilizing in place to form a flat layer on curved sidewall 210 due to the influence of centrifugal force caused by rotation of drum 102. FIG. 3C also shows how multiple laser diodes 308 can be active at once. Furthermore, as additional layers of material get built up on sidewall 210 a position of lens assembly 302 shifts position to keep a focus of laser diodes 308 on the latest layer of material added. In some embodiments, light source module 116 can be calibrated without fixing any minor positioning anomalies with the multiple laser diodes and associated optics. Instead a location of the light can be observed and then operation of the system can be adjusted so that lasers that are out of alignment adjust their timing so that the right material is solidified at the right time. In some embodiments, light source assembly can be tested at the beginning of each operation so that proper calibration can be confirmed and/or updated to get optimal results. The calibration causes the plans for creating the part to be adjusted for any lasers that are determined to be out of alignment so that the lasers activate at the proper time.

Figure 3D:
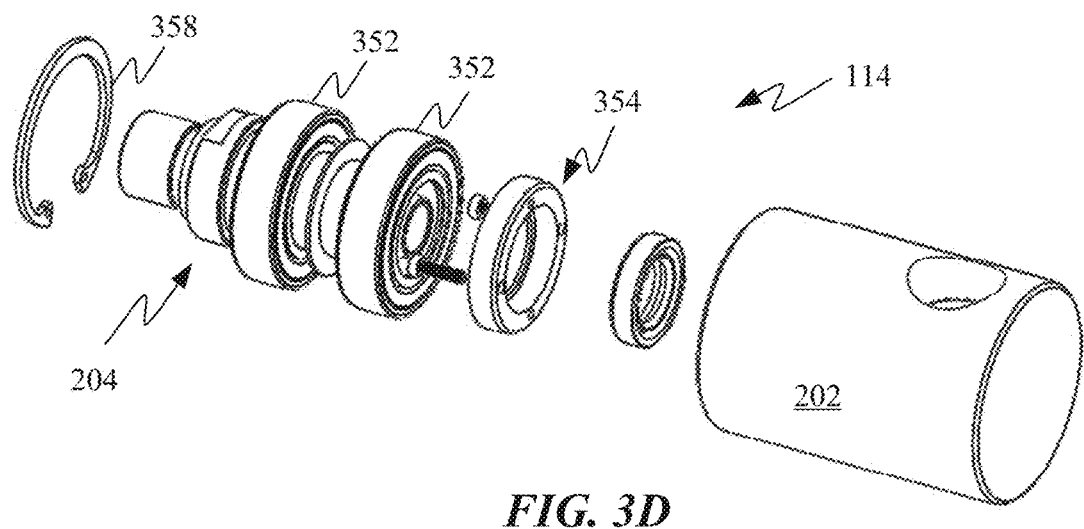
FIG. 3D-3E show exploded and cross-sectional views of a specific implementation of a rotary union.
Figure 3E:
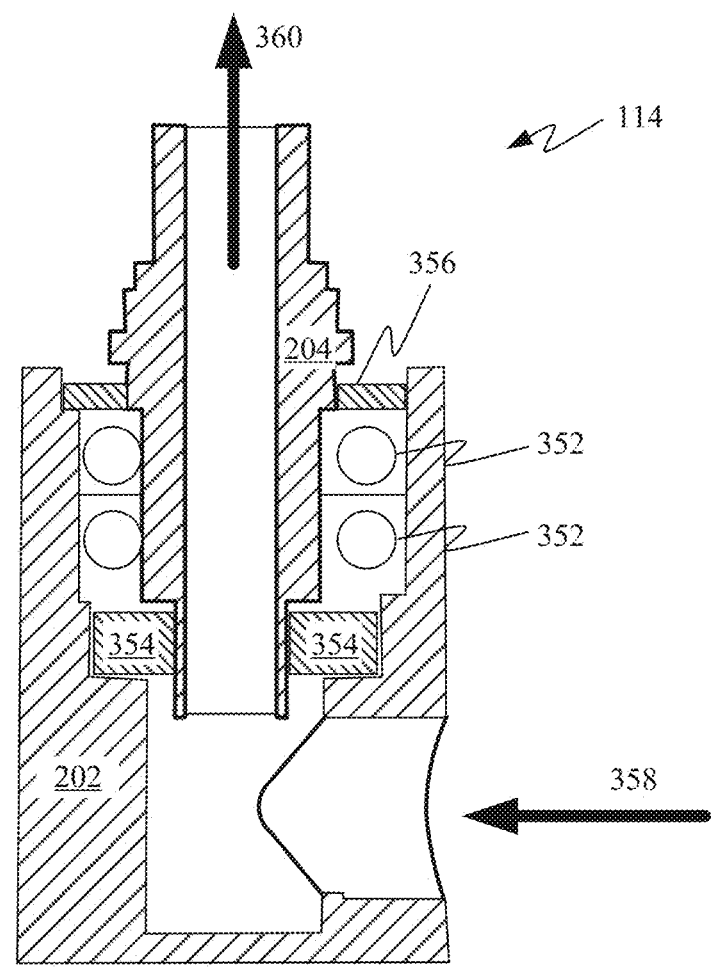

FIG. 3D-3E show exploded and cross-sectional views of a specific implementation of rotary union 114. In particular, lower assembly 202 can be referred to as a rotary union body and upper assembly 204 can be referred to as a rotary union spindle. Upper assembly 204 is able to spin relative to lower assembly 202 without generating much friction on account of ball bearings 352. This is much more efficient than most current solutions that rely on two rubbing rings/surfaces, which would generate a much larger amount of heat than desired. In some embodiments, the surfaces in contact with the ball bearings can be polished to further reduce the amount of heat/wear generated during part operation. A seal 354 is positioned near a base of upper assembly 204 and prevents the ingress of liquids into the portion of rotary union 114 in which ball bearings 352 resides. A retaining ring 356 can be used to keep ball bearings 352 seated between upper assembly 204 and lower assembly 202. When rotary union is being used to add material into material delivery channel 112, the material enters rotary union 114 at the location indicated by arrow 358 and exits rotary union 114 at the location indicated by arrow 360.

Figure 4A:
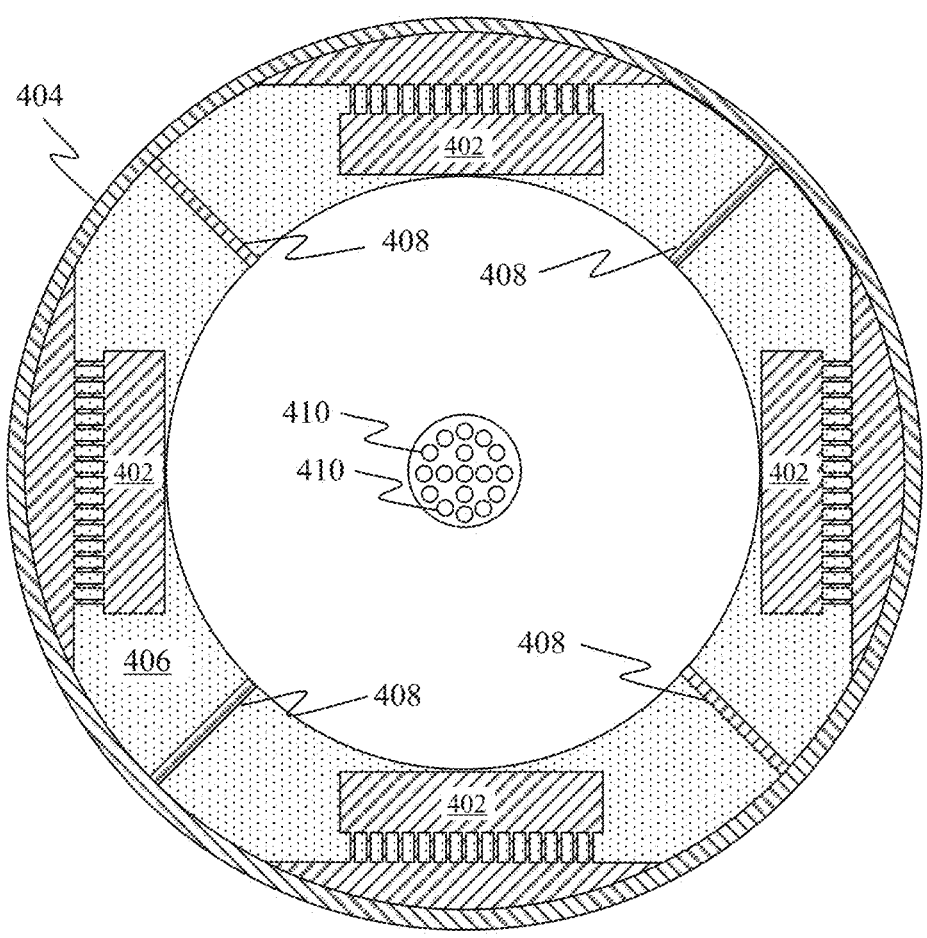
FIG. 4A shows a top down cross-sectional view of multiple parts being prepared in a drum of a centrifugal additive manufacturing system in accordance with the described embodiments.

FIG. 4A shows a top down cross-sectional view of multiple parts 402 being prepared in a drum 404 of a centrifugal additive manufacturing system in accordance with the described embodiments. Parts 402 are formed by solidifying the material added into drum 404 over the course of part formation. FIG. 4A shows how drum 404 looks before spinning down so that unsolidified material 406 remains affixed to sidewalls of drum 404. In addition to parts 402, flow stoppers 408 can be formed between parts. Flow stoppers 408 are configured to prevent waves of unsolidified material from being formed during rotation of drum 404 and causing undesirable rotational motion likely to negatively affect production of parts and/or diminish the lifespan of the machine. In some embodiments, instead of using the additive manufacturing system for forming the flow stoppers 408, pre-made flow stoppers or fins can be attached to drum 404 by either slotting into a main body of drum 404 or by attaching to a lid of drum 404 and then being lowered into an interior volume defined by drum 404. It should be noted that by scaling up the size of drum 404 can result in a less severe curvature and fewer issues creating parts with flat surfaces. In some embodiments an orientation of the part within drum 404 can be established to minimize issues in which many surfaces require multiple layers to form.

FIG. 4A also demonstrates how the curvature of the powder layers can differ from the geometry of parts 402 that have linear surfaces. One result is that unlike slower conventional flat additive manufacturing system a flat surface facing the longitudinal axis of drum 404 is constructed using more than one layer due to the mismatch between the layer geometry and the part geometry. In these instances there can be some amount of surface discontinuity as a result when layers have a larger thickness. One advantage to the fixed laser configuration described herein is that power output of the laser can be modulated to produce a smoother surfaces in situation where a single surface needs to be produced over the course of multiple layers. For example, a processor can be configured to modulate the output power of each laser diode of the light source module between at least three different power states (e.g., off, full power and partial power). In some embodiments, previously mentioned fine tuning of determination of rotational positioning allows partial power passes to be applied with high accuracy to smooth areas that might otherwise show obvious scan lines between layers. Conventional additive manufacturing systems utilize a fixed power laser and so must just accept any rough part surfaces resulting from these mismatches in part and material layer geometry.

Figure 4B:
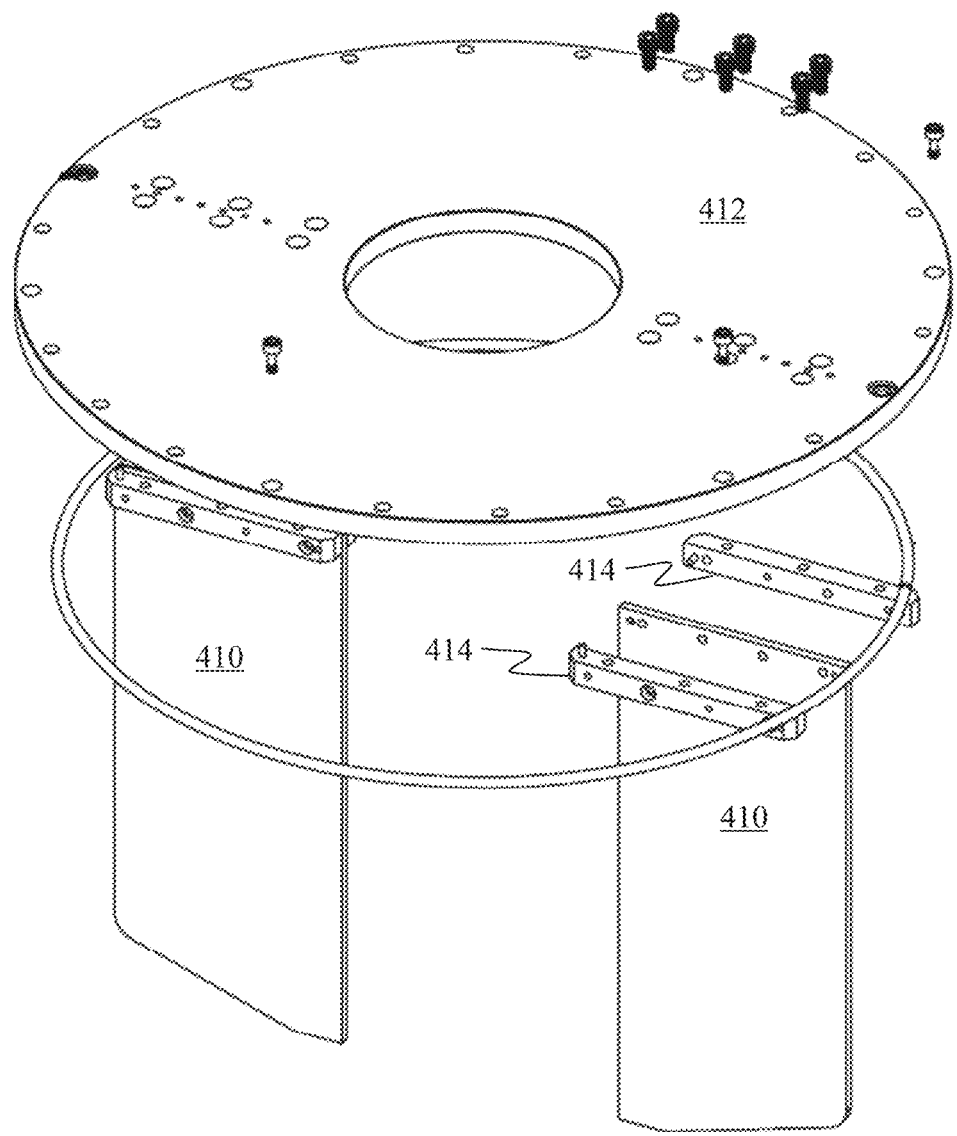
FIG. 4B shows an alternative embodiment in which fins 410 are attached to an interior-facing surface of a lid of a drum.

FIG. 4B shows an alternative embodiment in which fins 410 are attached to an interior-facing surface of lid 412. Fins 410 can be attached via one or more fasteners that extend through openings in lid 412 and into adapters 414 configured to secure fins 410 to lid 412. In this way fins 410 act as flow stoppers or flow inhibitors removing the need to have the additive manufacturing system create flow stoppers.

Once parts are formed the system can be further configured to evacuate unsolidified material 406 through openings 410 that allow the unsolidified material 406 to exit through material delivery channel 112 (see FIGS. 2-3C). Following evacuation of unsolidified material 406, alcohol can be pumped into and back out of drum 404 again using the material delivery channel 112 in order to clean parts 402 of any excess unsolidified material 406. Following the cleaning step material delivery channel 112 can again be utilized to introduce curing agent into drum 404. In addition to carrying a set of laser diodes for solidifying the working material within the drum, the light source module can also include a set of LEDs having an output suited for curing finished parts following the washing process. Manufacturers can save substantial time and expense since the described embodiments do not require the finished parts to be taken to a variety of different locations to undergo the washing and curing steps.

Figure 5:
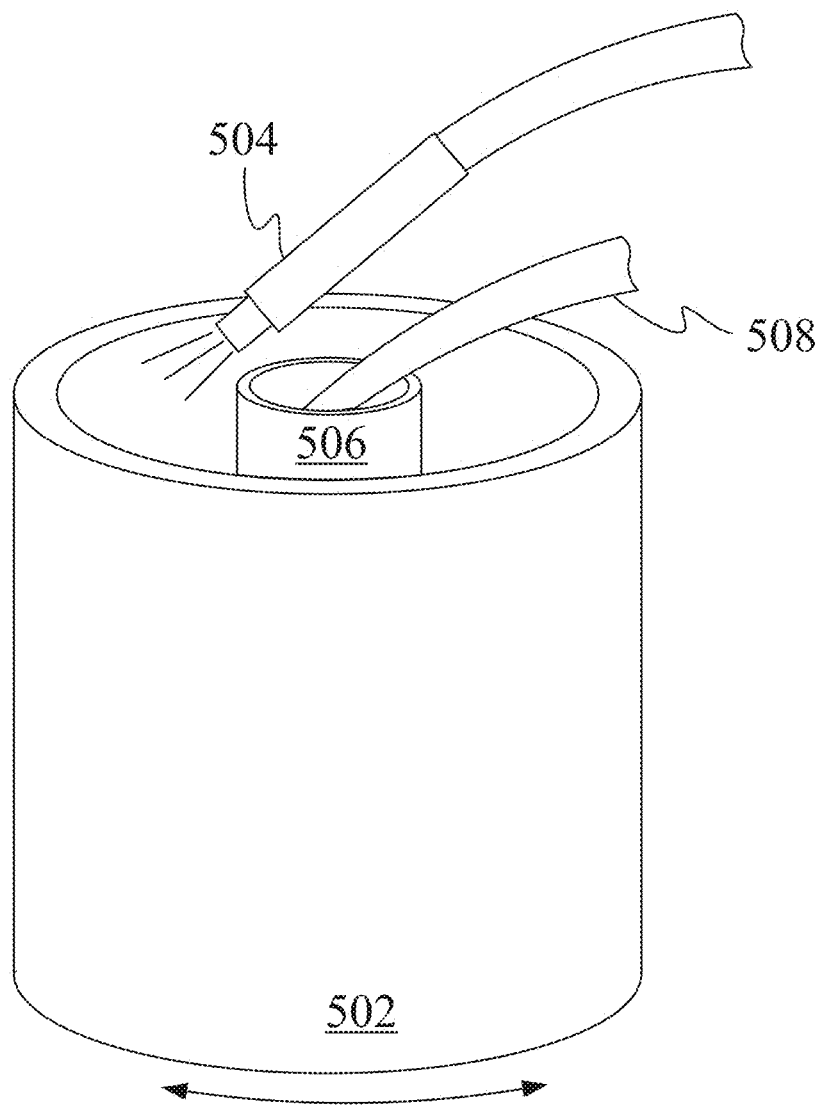
FIG. 5 shows an alternative embodiment in which a drum is rotated at high speeds while metal powder mixed with a gas such as nitrogen is blown into a drum at a 30 to 60 degree angle depending on the dimensions of drum using a gas blower.

FIG. 5 shows an alternative embodiment in which a drum 502 is rotated at high speeds while metal powder mixed with a gas such as nitrogen is blown into drum 502 at a 30 to 60 degree angle depending on the dimensions of drum 502 using a gas blower 504. By angling the gas-borne metal powder into drum 502 the metal powder imbued gas forms a vortex within drum 502 and then centrifugal force exerted on the metal powder keeps the metal powder affixed to interior facing curved walls of drum 502 while a light source assembly 504 is lowered into drum 502 in a similar way as to how it is placed in the previously described drum and light source assemblies. Metal powder generally takes a more powerful type of laser such as, e.g., a YAG laser. In this embodiment, a YAG laser can be positioned outside drum 502 and its light channeled into light source assembly 504 using multiple fiber optic cables such that the output of the single powerful YAG laser can be divided to have a similar but more powerful configuration that the light source module described with regards to system 100. Each fiber optic cable can be incorporated into cable bundle 508 and attached to an optical pathway that can include focusing elements within light source assembly 504. An acousto-optical modulator can be arranged along each of the fiber optic cables and configured to turn off and on the laser output being split into each of the fiber-optic cables, to correspond to requirements for building parts within drum 502.

Figure 6:
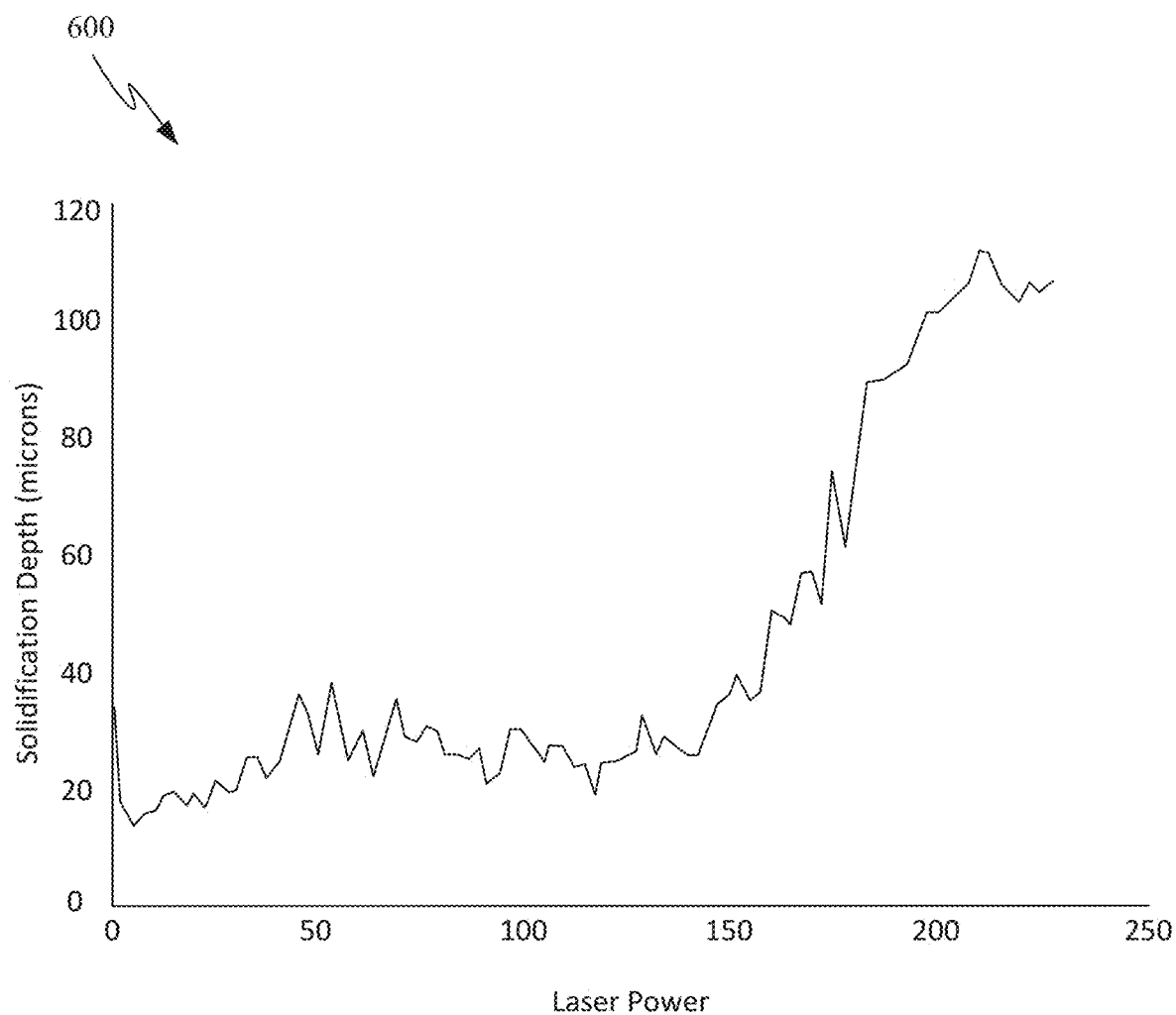
FIG. 6 shows an exemplary plot 600 showing the importance of various parameters to the success of operation of the present additive manufacturing embodiments.

FIG. 6 shows an exemplary plot 600 showing the importance of various parameters to the success of operation of the present additive manufacturing embodiments. In particular, it shows how laser power must be modulated in order to get a desired depth of part material solidification. Solidifying too deep or too shallowly can result in part inaccuracies. This graph also demonstrates how a partial power laser could be configured to perform the type of layer blending operation described above as it allows for a different depth of solidification to be achieved thereby creating a blending layer in places.

Figure 7:
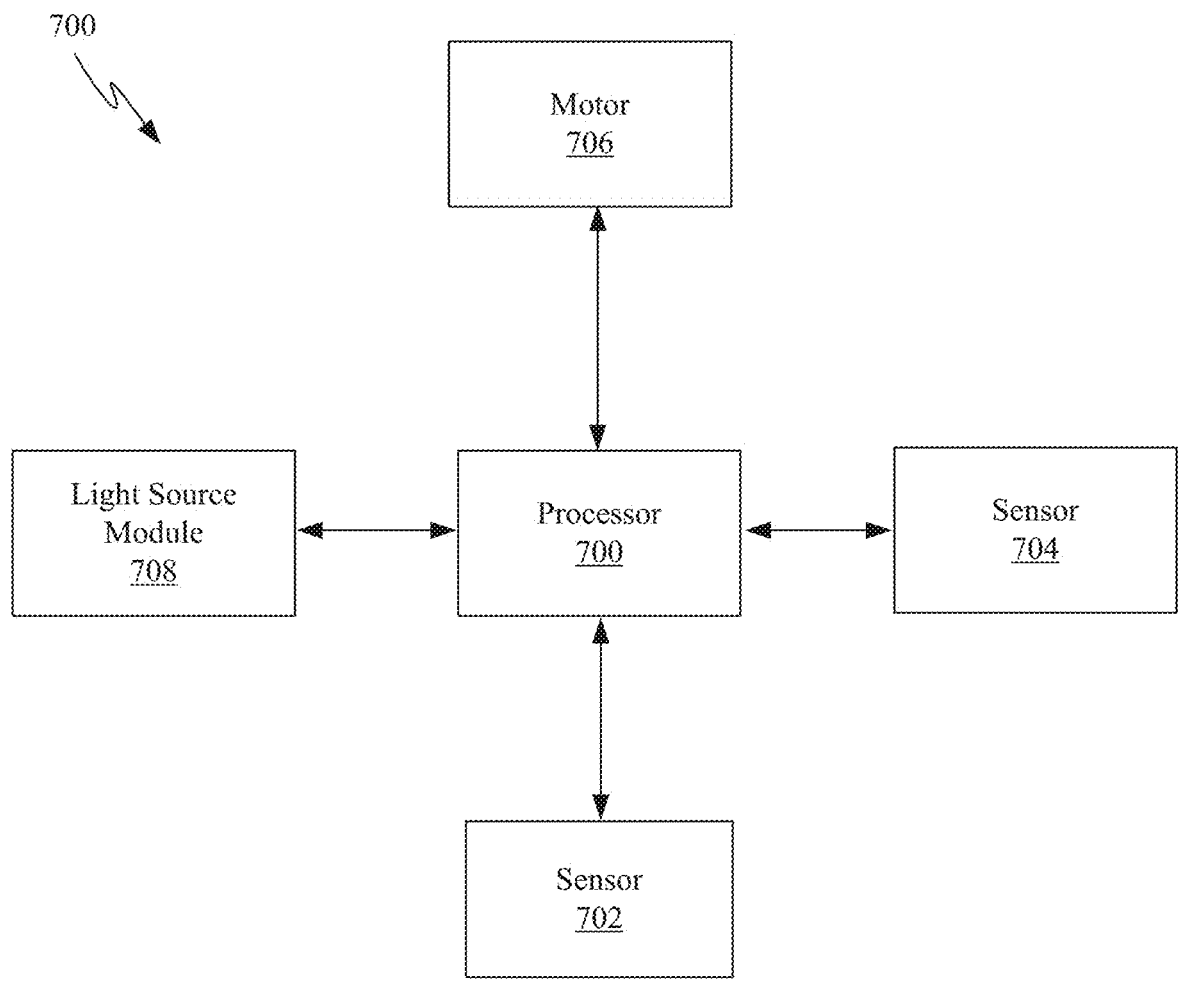
FIG. 7 shows an exemplary electronic device usable with the described embodiments.

FIG. 7 shows an exemplary electronic device 700 usable with the described embodiments. In particular, processor 700 represents one or more processors responsible for operation of a system such as system 100. Processor 700 can be responsible for collecting information from multiple sensors, such as sensors 702 and 704. In some embodiments, sensor 702 can take the form of a laser indexer utilized to measure a rotational position of a drum of a system. As discussed previously, processor 700 can be configured to use the position information provided by the laser indexer, calculate a speed and/or acceleration of the drum at any point in time to accurately estimate with high accuracy a position of the drum at any point in time. Processor 700 can then take the position, speed and/or acceleration information and use it to adjust operation of motor 706 utilized to spin the drum and/or modulate output of light source module 708. In some embodiments, processor 700 may want to avoid requiring too strict an operating speed as additions of materials into the drum can result in changes in to the drum inertia and rotational energy that can make maintaining a strict band of rotational velocity overly difficult. As long as the rotational position sensor accurately tracks speed, processor 700 can command changes to operation of light source module 704 in order to achieve highly accurate part accuracies.

Figure 8:
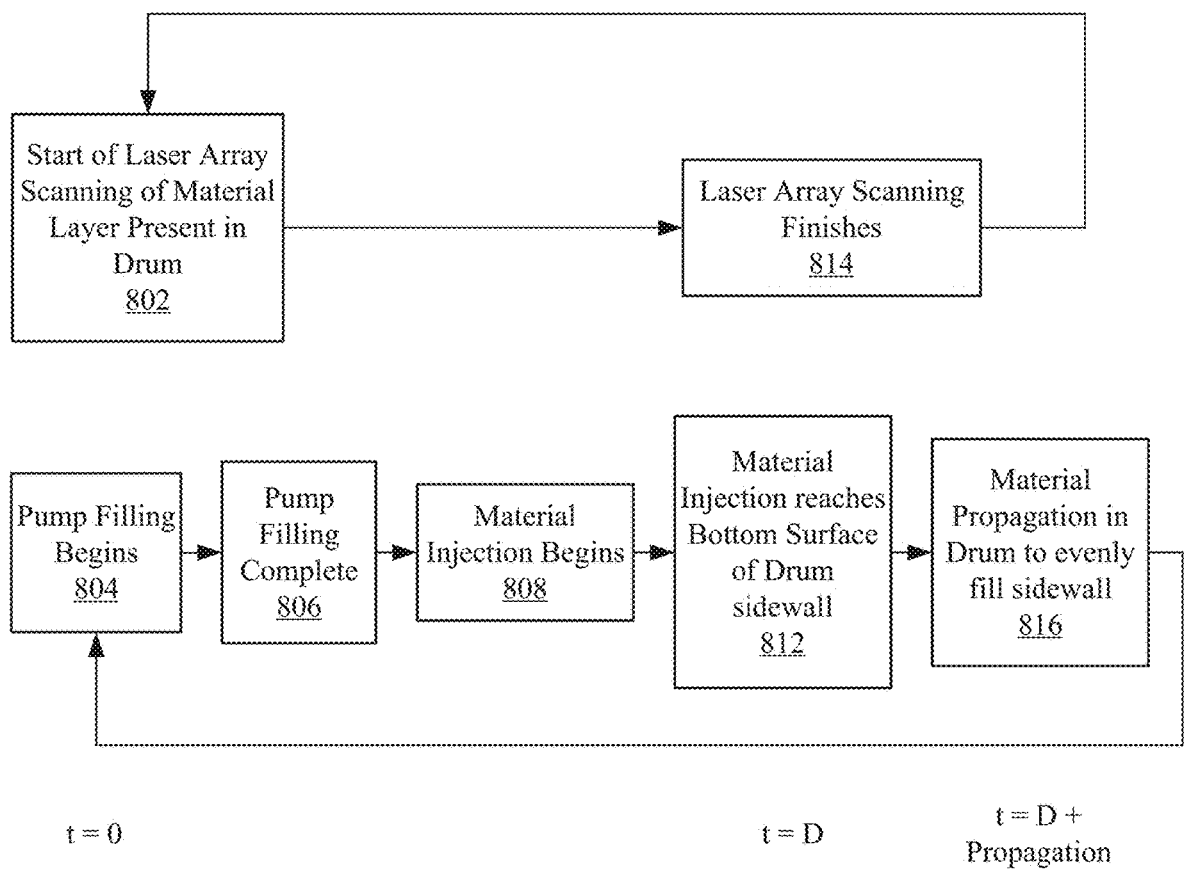
FIG. 8 shows a timeline illustrating operation of an exemplary additive manufacturing device compatible with the embodiments depicted in FIGS. 1A-4B

FIG. 8 shows a timeline illustrating operation of an exemplary additive manufacturing device compatible with the embodiments depicted in FIGS. 1A-4B. At 802 and at time t=0, an array of lasers of a light source module begins scanning a material layer arranged upon a sidewall of a drum in accordance with the previously described embodiments. At 804 and also at time t=0, a fixed amount of temperature controlled working material is prepared for injecting into a material delivery channel of the additive manufacturing system. In embodiments where the pump mechanism takes the form of a syringe style delivery system, the syringe begins to be filled at time t=0 with the fixed amount of working material in preparation for injecting. Other pump mechanisms can include a small holding tank where the fixed amount of working material is stored while waiting for injection into the system. At 806, the pump mechanism filling completes while the laser array continues scanning the working material previously added to the drum.

At 808, the pump mechanism begins moving the fixed amount of working material into the material delivery channel where it begins making its way toward the drum. At 808 and time t=D, the working material after entering the drum reaches a base of an interior-facing curved surface of the drum. At 814 and also at time t=D the light source module ends the scanning operation and the working material starts to climb up the curved interior sidewall. At 816 and time t=D+propagation, the new layer of working material evenly coats the interior-facing surface of the drum and the process returns to 802 and 804 where laser scanning and pump filling begin again It should be appreciated that while some specific examples of working materials have been given, such as photopolymers that other types of materials are also possible. For example, in some embodiments, the working material can take the form of a slurry incorporating metal powder that allows for the formation of a metal part using the embodiments shown in FIGS. 1A-4B.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope. Skilled artisans may implement the described functionality in varying ways for each particular application, but such implementation decisions should not be interpreted as causing a departure from the scope of the disclosed apparatus and methods. The steps of the method or algorithm may also be performed in an alternate order from those provided in the examples.

What is claimed is:
1. A system, comprising:
a drum comprising an interior-facing curved surface;
a light source module emitting a light capable of solidifying a working material arranged along the interior-facing curved surface of the drum;
a motor affixed to and configured to apply a rotational movement directly to the drum, wherein the motor defines an opening extending along a longitudinal axis of the motor from a first end of the motor to a second end of the motor; and a material delivery system comprising a material delivery channel that extends through the opening defined by the motor and to a base of the drum.

2. The system of claim 1, wherein at least a portion of the material delivery system extending through the motor rotates at the same speed as the drum during operation of the system.

3. The system of claim 1, further comprising:
a sensor configured to measure a rotational speed of the drum; and
a processor configured to direct changes to operation of the light source module based on a determined rotational position and/or speed of the drum.

4. The system of claim 3, wherein the sensor is a laser indexer and wherein the processor is configured to interpolate a rotational position of the drum based on a tic mark of the laser indexer most recently detected by the laser indexer and an estimated rotational speed of the drum.

5. The system of claim 1, further comprising a rotary union disposed at a first end of the material delivery channel, the rotary union comprising an upper assembly configured to rotate with the material delivery channel and a lower assembly mated with a conduit, wherein a second end of the material delivery channel, opposite the first end, is coupled to and rotates with the drum and wherein the conduit is configured to deliver the working material into the rotary union.

6. The system of claim 5, wherein the rotary union further comprises a ball bearing configured to reduce friction during rotation of the upper assembly relative to the lower assembly.

7. The system of claim 1, wherein the drum further comprises a sloped bottom surface and wherein the material delivery system is configured to supply the working material to the sloped bottom surface of the drum.

8. The system of claim 7, wherein the sloped bottom surface has a slope of between ten and twenty degrees.

9. The system of claim 1, wherein the light source module is configured to translate vertically within the drum to irradiate different portions of the working material positioned on the interior-facing curved surface.

10. The system of claim 9, wherein the light source module comprises a plurality of laser diodes arranged in a vertical configuration.

11. The system of claim 10, further comprising a processor configured to:
receive misalignment data for each of the plurality of laser diodes; and
adjust operation of the light source module based on misalignment data for each of the plurality of laser diodes of the light source module.

12. The system of claim 1, wherein the working material is a photopolymer material.

13. The system of claim 1, further comprising a processor configured to adjust operation of a power output of the light source module based on geometry of parts being produced within the drum.

14. The system of claim 13, wherein the power output variation includes adjusting the output power of the light source module between three or more different power output states.

15. The system of claim 1, wherein the material delivery system is configured to periodically add a specific amount of working material to the drum sufficient to create a 5-250 micron layer of working material on the interior-facing curved surface of the drum.

16. The system of claim 1, wherein the drum comprises one or more fins that inhibit a radial flow of working material within the drum during operation of the system.

* * * * *